2

3,230,760
NON-DESTRUCTIVE TESTING OF
PRESSURE VESSELS
Samuel R. Fryer, Jr., Freeport, Malcolm Sherrill, Jr., Lake Jackson, and Roy C. Jorgensen, West Columbia, Tex., assignors to The Dow Chemical Company, Midland, Mich., a corporation of Delaware
Filed June 12, 1964, Ser. No. 374,700
4 Claims. (Cl. 73—37)

This invention relates to the non-destructive testing of pressure vessels, and, more particularly is concerned with an improvement in an apparatus and method for non-desrtuctive hydrostatic testing of pressure vessels.

In the hydrostatic testing of pressure vessels, a substantially incompressible fluid is pumped, under pressure, into a fluid-filled test vessel. As an increasing quantity of fluid is pumped into said vessel the internal pressure of said vessel rises. The quantity of fluid pumped into the vessel is proportional to the internal pressure in said vessel until the elastic limit of the vessel has been reached. Beyond the elastic limit, quantity of fluid pumped and internal pressure are no longer proportional to one another. This readily can be seen, for example, from a recording of the internal pressure versus quantity of fluid introduced into a fluid-filled vessel under test wherein a straight line is produced prior to the vessel reaching its elastic limit. Beyond this elastic limit, the line deviates in slope.

Ordinarily pressure versus volume or pressure versus time (if a constant volume delivery pump is used), is plotted by a recorder in a non-destructive hydrostatic pressure test and the test is terminated at the point where the line deviates in slope, i.e., at about the elastic limit of the vesel undergoing test. However, precision and accuracy of the plot can be detrimentally affected by one or more of the following: non-uniform pump rates, slippage in drive coupling between pump and recorder, and faulty valve action of the pump. The present invention, therefore, is directed to an improvement in and substantial elimination of these detrimental effects.

The term "pressure vessel" as used herein, means closed or sealable containers of any shape which ordinarily are subjected to pressure in use and is meant to include gas storage cylinders, reactor tanks, pressure tubing and pipes, pipe lines, tank cars, storage tanks, boilers, boiler tubes, missile parts, combinations of the same and the like.

The term "transducer" as used herein means a device activated by power from one system and supplying power to a second system.

It is a principal object of the present invention to provide a novel improvement in methods for the non-destructive hydrostatic testing of pressure vessels.

It is a further object to provide an improvement in the testing of pressure vessels whereby the elastic limit of the test vessel is determined in terms of internal pressure in said vessel versus weight of liquid pumped into said vessel.

It is another object to provide an improvement in the testing of pressure vessels wherein leaks which may not be ordinarily observable by an operator are readily detectable on a recording chart.

It is still a further object to provide an improvement in the testing of pressure vessels wherein non-uniformity of pumping rates, slippage in drive couplings between pump and recorder, and faulty valve action of the pump do not detrimentally affect the precision and accuracy of the test.

The foregoing and other objects and advantages of the present invention will become apparent from the detailed description presented hereinafter and by reference to the accompanying drawings.

The instant invention is an improvement in a method of non-destructive hydrostatic testing of a pressure vessel exhibiting elastic deformation on being subjected to the distending of a substantially incompressible liquid. This method includes the steps of pumping a substantially incompressible liquid from a liquid supply container into the interior of a liquid-filled vessel, thereby to increase the internal pressure within said vessel above the ambient pressure on said vessel; automatically plotting on a recorder a single line graphic record of the resulting pressure inside the vessel as a function of the quantity of liquid so introduced into the vessel; determining from the record the point at which the pressure in said vessel is not proportional to the quantity of liquid introduced into said vessel, thereby detecting the elastic limit of the vessel; and discontinuing the introduction of said liquid into said vessel at about said elastic limit. The instant improvement in said method comprises: connecting a weight transducer to said recorder and to the container holding the liquid supply. As liquid flows to the pump from the container, the weight of the liquid in the container decreases. The weight transducer detects this decrease in weight and transmits an electrical voltage to said recorder, said voltage corresponding to the decrease in weight of liquid in said liquid supply container. The decrease in weight of the liquid in said container thereby provides an accurate and readily discernible measure of the liquid introduced into the pressure vessel undergoing test. This is noted and can be plotted with respect to the pressure within the test vessel.

Figure 1:
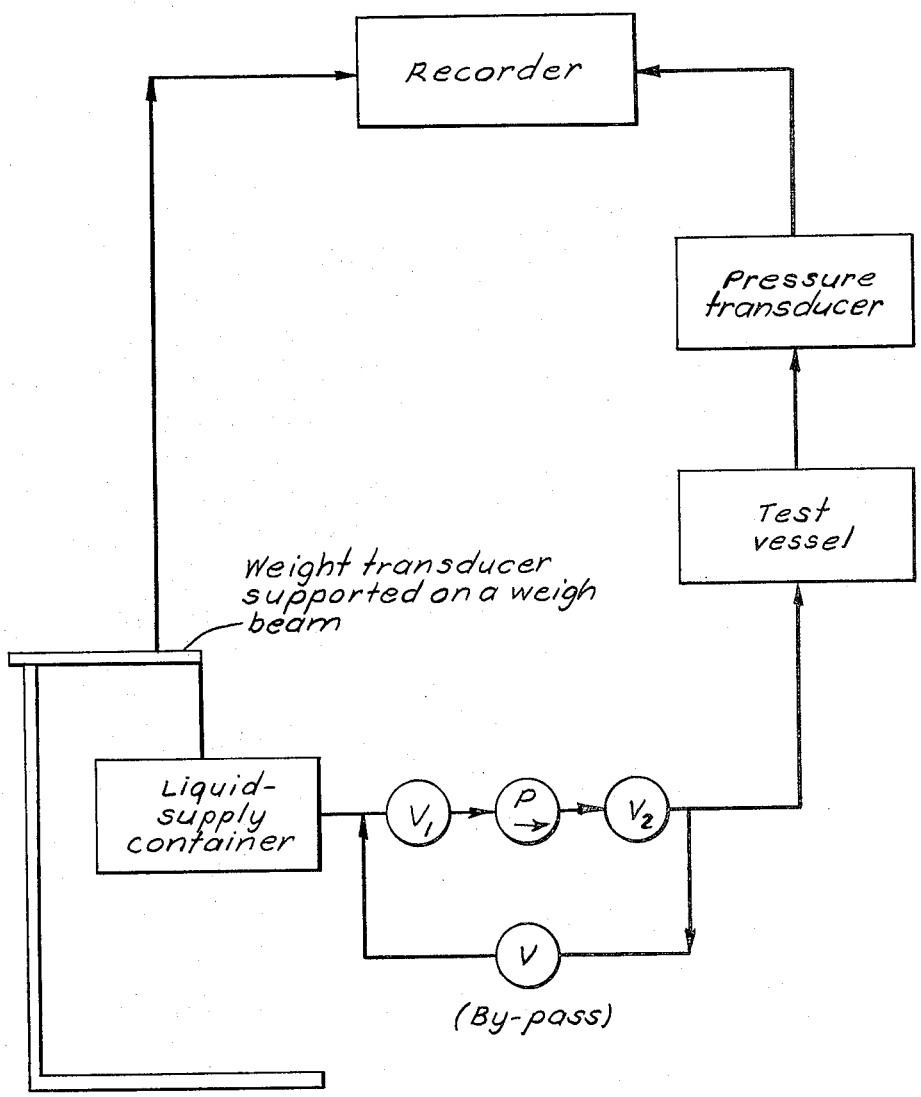
FIGURE 1 shows schematically a pressure vessel testing apparatus used in the method of the instant invention with a pressure vessel attached thereto.

In carrying out the instant invention, an apparatus is assembled as shown in the embodiment of FIGURE 1. This consists of a weight transducer supported on a rigid member called a weigh beam. A liquid supply container is connected to the weight transducer and suspended from the weigh beam. The liquid container also is connected by conduit, pipe or tubing through a pump to the interior of the vessel being tested. The weight transducer can, for example, be in the form of a strain gauge bridge circuit attached to the beam. In operation, as liquid is pumped from the liquid supply container into the test vessel the decrease in weight in said container is detected by said weight transducer, the loss in weight converted into a corresponding electrical voltage and transmitted to the recorder.

Weight transducers which are suitable for use herein include, for example, commercial weigh beams or weigh cells. These units use strain gauge bridge circuits applied to a stress beam or shaft.

The pump, pressure transducer recorder, and incompressible liquids suitable for use herein are those which are normally used in methods for the non-destructive, hydrostatic testing of pressure vessel.

The following examples are merely illustrative of the instant invention but in no way are meant to limit it thereto.

Example I

Figure 2:
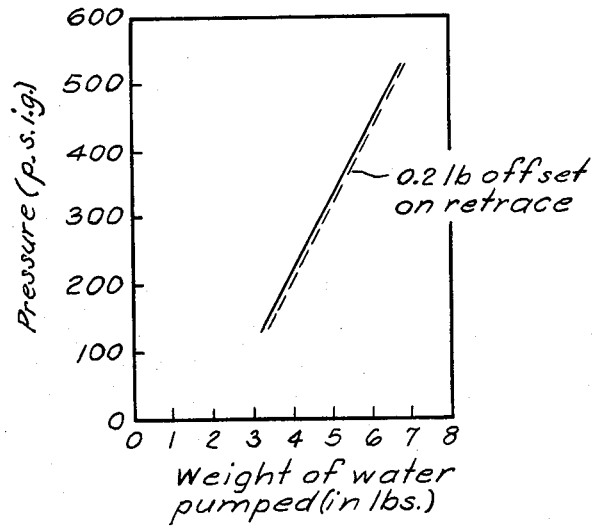
FIGURE 2 shows a record of a pressure test conducted on a test vessel in accordance with the instant invention using an apparatus assembly similar to that shown in FIGURE 1. The broken line in FIGURE 2 is a retrace.

A test vessel consisting of a steel tank of about 30 inches in diameter, about 60 inches in length and having a wall thickness of about ¼ inch was inserted into an apparatus set up similar to that shown in the embodiment of FIGURE 1. The test vessel was filled with water and was connected to a fluid supply tank and pump. The pump was of the positive displacement type. A typical commercial pressure transducer was attached to the test vessel and through its wire cable was connected to an X–Y type recorder. A weight transducer in the form of a typical commercial weigh beam-transducer combination was then connected to the recorder and said water supply tank. The weight transducer was mounted on a weigh beam. The water supply tank was suspended from the weigh beam, said beam in turn was mounted on a magnesium frame. Having attached the vessel to the test apparatus, the pump was started. As the weight of water introduced into the test vessel increased, the pressure in said vessel began to rise. The weight of water pumped into the water-filled vessel was detected by the weight transducer by said transducer measuring the decrease in weight of the water in the water supply tank. This decrease in weight had the effect of varying the resistance element in said weight transducer. An electrical voltage which was indicative of, i.e. proportional to the decrease in weight of said fluid supply tank was then sent to the recorder. The pressure impulses detected by the pressure transducer also were sent to the recorder in the form of an electrical voltage. As the pressure rose, the recorder produced a line, drawn by the recording pen. This line indicated both the pressure within the vessel at any given time as a function of weight decrease of said water supply tank (equivalent to the liquid volume or liquid weight increase within the vessel). As long as the pressure imparted to the vessel was in that range where the structural material of the test vessel was still within its elastic limit the pressure increase versus weight of water pumped was a straight line. However, as increasing weight of water were pumped into said vessel and internal pressure increased, the elastic limit of the test vessel was surpassed at about 532 pounds per square inch gage as shown by the deviation in slope of the line drawn by the recorder pen (see FIGURE 2). At this point, where deviation from the straight line started to occur, the elastic limit of at least some portion of the test vessel had been exceeded. Pumping of water into the test vessel was then stopped.

In order to double-check the pressure test on said vessel to determine if the elastic limit of the vessel actually was reached the following procedure was carried out.

Figure 3:
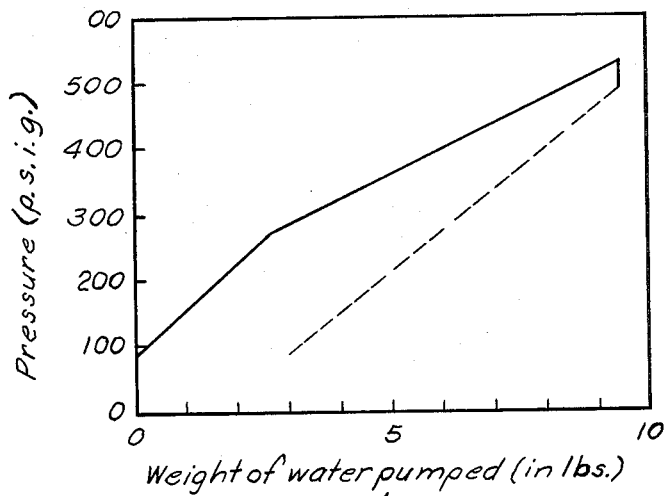
FIGURE 3 shows a record of a pressure test conducted on a test vessel which had a leak using apparatus similar to that shown in FIGURE 1.

Pump by-pass valve was opened so that water from the test vessel returned to the water supply tank. The recorder pen was left down on the recorder chart so that the pressure versus weight curve of the recorder was retraced to zero pressure and zero weight. The result as seen by the dashed line in FIGURE 3 was a trace of a line parallel to the solid line offset by about 0.2 pound of water on the abscissa. This showed that the pressure-test was conducted beyond the elastic limit of the test vessel whereby the permanent volume of the tank increased by the volume occupied by 0.2 pound of water.

Thus, the instant system not only detected the weight of water introduced into the water-filled test vessel, but in addition recorded the small increase in volume of the test vessel after it was allowed to be controllably tested to determine its elastic limit.

Example II

In order to show the retrace of a pressure versus weight curve of a pressure vessel tested below its elastic limit produced by a non-destructive hydrostatic pressure test incorporating the instant improvement, the same procedure was carried out on the same vessel, as set forth in Example I. The vessel described in Example I was retested by the procedure set forth in this example except that the test was terminated at a pressure of about 440 pounds per square inch gauge. A straight line was recorded thus showing that the test was terminated prior to the reaching of the elastic limit of the test vessel. Valves 1 and 2 were closed and pump by-pass was then opened thereby allowing water to bleed back into the water supply tank. During this operation of pressure release the recorder pen was left in tracing position and retraced directly over the original line.

This graphically showed that there had been no inelastic deformation of the pressure since. If there had been inelastic deformation, the retrace would have been offset from the original graphic record by an amount substantially equal to the inelastic volume expansion of the vessel.

Example III

In order to show the effectiveness of the present invention in detecting a small leak in a test vessel the following procedure was carried out using the system and method set forth in Example I. A valve on the test vessel was opened a small amount at about 210 p.s.i.g. to provide a "leak" while the test vessel was pressurized to approximately its elastic limit. The water which "leaked" through the valve was collected. As seen from FIGURE 3, there was a slight change in slope of the graphic record over the pressure range of from about 210 p.s.i.g. to the elastic limit. The pump was stopped at about the elastic limit, valves 1 and 2 were closed, pump by-pass valve was opened and the pressure versus weight line retraced. This is depicted as a broken line in FIGURE 3. As readily can be seen the broken line retrace is nonparallel to and offset from the original trace by a distance representing nearly three pounds of water. Measurement of this "leaked" water indicated this actually was about three pounds.

Various modifications can be made in the instant invention without departing from the spirit or scope thereof, for it is to be understood that we limit ourselves only as defined in the appended claims.

We claim:

1. In a method for the non-destructive testing of a pressure vessel which exhibits elastic deformation on being subjected to the distending action of a substantially incompressible liquid including the steps of: pumping a substantially incompressible liquid received from a liquid supply container into the interior of a liquid-filled vessel, thereby to increase the internal pressure within said vessel above the ambient pressure on said vessel; automatically plotting on a recorder a single line graphic record of the resulting pressure inside the vessel as a function of the quantity of liquid so introduced into the vessel; determining from the record the point at which the pressure in said vessel is not proportional to the quantity of liquid introduced into said vessel, thereby detecting the elastic limit of the vessel; and discontinuing the introduction of said liquid into said vessel at about said elastic limit, the improvement which comprises:

(a) connecting a weight transducer to said recorder and to the liquid-supply container; and
   (b) transmitting an electrical voltage via said weight transducer to said recorder, said voltage corresponding to the decrease in weight of liquid in said liquid supply container pumped into said test vessel.

2. The improvement in accordance with claim 1, including the step of attaching said weight transducer to a rigid member and suspending said liquid supply from said rigid member.

3. In an apparatus for the non-destructive testing of pressure vessels which includes, a container with a pump for delivery of liquids under pressure, a liquid supply therein for said pump, a pressure transducer and recorder said pump connected to said liquid supply container and to a pressure vessel undergoing test, said pressure transducer attached to said pressure vessel and to said recorder, the improvement which comprises: a weight transducer connected to said recorder and to said liquid supply container such that said weight transducer transmits an electrical voltage to said recorder, said voltage corresponding to the weight of liquid delivered from said liquid supply container to said vessel.

4. The improvement in accordance with claim 3, wherein said weight transducer is attached to a rigid member and said liquid supply container is suspended from said rigid member.

References Cited by the Examiner
UNITED STATES PATENTS

| | | | |
|---|---|---|---|
| 2,398,334 | 4/1946 | Sinclair | 73—290 X |
| 2,539,843 | 1/1951 | Kerr | 73—37 |

FOREIGN PATENTS

| | | |
|---|---|---|
| 247,419 | 10/1963 | Australia. |
| 489,306 | 1/1954 | Italy. |

LOUIS R. PRINCE, *Primary Examiner.*